(12) United States Patent
Lesartre et al.

(10) Patent No.: US 9,946,656 B2
(45) Date of Patent: Apr. 17, 2018

(54) COMPLETION PACKET RETURN BASED ON EVICTION OR FLUSH

(71) Applicant: Hewlett-Packard Development Company, L.P., Houston, TX (US)

(72) Inventors: Gregg B. Lesartre, Fort Collins, CO (US); Derek Alan Sherlock, Boulder, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/786,834

(22) PCT Filed: Aug. 30, 2013

(86) PCT No.: PCT/US2013/057678
§ 371 (c)(1),
(2) Date: Oct. 23, 2015

(87) PCT Pub. No.: WO2015/030819
PCT Pub. Date: Mar. 5, 2015

(65) Prior Publication Data
US 2016/0162412 A1 Jun. 9, 2016

(51) Int. Cl.
*G06F 12/00* (2006.01)
*G06F 12/0891* (2016.01)
*G06F 13/38* (2006.01)
*G06F 12/12* (2016.01)

(52) U.S. Cl.
CPC .......... *G06F 12/0891* (2013.01); *G06F 12/12* (2013.01); *G06F 13/382* (2013.01); *G06F 13/385* (2013.01)

(58) Field of Classification Search
CPC .. G06F 2212/69; G06F 13/385; G06F 13/382; G06F 12/12; G06F 12/0891
See application file for complete search history.

(56) References Cited

U.S. PATENT DOCUMENTS

| | | | |
|---|---|---|---|
| 6,470,437 B1 * | 10/2002 | Lyon | G06F 12/1054 711/144 |
| 6,745,294 B1 * | 6/2004 | Wilson | G06F 12/0804 710/200 |
| 8,429,318 B1 | 4/2013 | Karamcheti et al. | |

(Continued)

FOREIGN PATENT DOCUMENTS

| | | |
|---|---|---|
| CN | 1466385 C | 1/2004 |
| CN | 102223510 B | 10/2011 |

(Continued)

OTHER PUBLICATIONS

International Searching Authority, The International Search Report and the Written Opinion, dated May 26, 2014, 12 Pages.

(Continued)

*Primary Examiner* — Larry T Mackall
(74) *Attorney, Agent, or Firm* — Hewlett Packard Enterprise Patent Department (57) ABSTRACT

A completion packet may be returned before a data packet is written to a memory, if a field of the data packet indicates the data packet was sent due to a cache capacity eviction. The completion packet is returned after the data packet is written to the memory, if the field indicates the data packet was sent due to a flush operation.

24 Claims, 4 Drawing Sheets

(56) References Cited

U.S. PATENT DOCUMENTS

| | | | |
|---|---|---|---|
| 2004/0006670 A1* | 1/2004 | Yoshida | G06F 12/0804 711/135 |
| 2004/0225849 A1* | 11/2004 | Wolczko | G06F 12/0269 711/165 |
| 2005/0041520 A1 | 2/2005 | Takahashi et al. | |
| 2007/0226411 A1* | 9/2007 | Ehrlich | G06F 12/0804 711/113 |
| 2009/0193216 A1 | 7/2009 | Melvin | |
| 2009/0300288 A1* | 12/2009 | Lefebvre | G06F 12/0804 711/128 |
| 2010/0185808 A1 | 7/2010 | Yu et al. | |
| 2010/0332612 A1* | 12/2010 | Johnsen | G06F 12/0817 709/216 |
| 2011/0029736 A1* | 2/2011 | Sato | G06F 12/0837 711/130 |
| 2011/0307653 A1 | 12/2011 | Rudelic et al. | |
| 2012/0079174 A1 | 3/2012 | Nellans et al. | |
| 2012/0079245 A1 | 3/2012 | Wang et al. | |
| 2013/0091330 A1 | 4/2013 | Mital et al. | |
| 2013/0114602 A1 | 5/2013 | Harriman | |
| 2014/0233132 A1* | 8/2014 | Budiman | G11B 20/10527 360/69 |

FOREIGN PATENT DOCUMENTS

| | | |
|---|---|---|
| CN | 102447608 B | 5/2012 |
| TW | 200915080 A | 4/2009 |
| TW | 200917017 A | 4/2009 |
| TW | 201324520 A | 6/2013 |
| WO | WO-2013066518 | 5/2013 |

OTHER PUBLICATIONS

Mukherjee, et al; "Using Prediction to Accelerate Coherence Protocols", < http://impact.asu.edu/cse520fa08/naresh.pdf >, Nov. 3, 2008.

* cited by examiner

COMPLETION PACKET RETURN BASED ON EVICTION OR FLUSH

CLAIM FOR PRIORITY

The present application is a national stage filing under 35 U.S.C. § 371 of PCT application number PCT/US2013/057678, having an international filing date of Aug. 30, 2013, the disclosure of which is hereby incorporated by reference in its entirety.

BACKGROUND

A device may include a controller that interfaces with a persistent memory. Data to be written to the persistent memory may be sent to the controller. Upon completion, the controller may acknowledge that the data has been written to the persistent memory. Manufacturers, vendors and/or suppliers are challenged to provide users with more efficient methods for writing the data to persistent memory.

BRIEF DESCRIPTION OF THE DRAWINGS

The following detailed description references the drawings, wherein.

DETAILED DESCRIPTION

Specific details are given in the following description to provide an understanding of examples of the present techniques. However, it will be understood that examples of the present techniques may be practiced without these specific details. For example, systems may be shown in block diagrams in order not to obscure examples of the present techniques in unnecessary detail. In other instances, well-known processes, structures and techniques may be shown without unnecessary detail in order to avoid obscuring the examples of the present techniques.

A device may include a controller, such as a memory controller that interfaces with a memory, such as a nonvolatile memory (NVM). A processor of the device may send data to be written to the memory to the controller. After the data is written to the memory, the controller may send a completion packet to the processor to acknowledge that the data has been successfully written to the memory.

New memory technologies are emerging that enable replacing system Dynamic random-access memory (DRAM) with nonvolatile devices of higher density and similar access latencies. Processor coherent protocols may be designed to work with volatile memories. However, these protocols have not been designed to support a low overhead commitment of coherently accessed non-volatile memory.

For instance, when data is written to volatile DRAM, the memory controller may indicate the write as complete as soon as an interface of the DRAM has received the data and can ensure it is returnable when the location is later accessed. This provides the better performance by reducing latency. However, when data is written to a persistent storage device, such as non-volatile memory, the memory controller may have to wait to indicate the write as complete until the data has actually been written to the persistent memory. While increasing latency, this may be required for correctness to ensure the data is not lost, such as if a power failure occurred before the data could be written to the persistent memory. Certain software code and/or operations may depend on data being committed to the persistent memory before carrying out a next step.

Examples may provide a coherent system protocol that allows a non-volatile memory controller to determine how to write data to memory based on an action of the processor. For example, the processor may indicate to the memory controller whether a write to the non-volatile memory should be handled as if writing the data to a transitory volatile memory or a persistent non-volatile memory. An example device may include a receiving unit and a writing unit. The receiving unit may receive a data packet including a field. The writing unit may return a completion packet in response to the data packet. The writing unit may return the completion packet before the data packet is written to a memory, if the field indicates the data packet was sent due to a cache capacity eviction. The writing unit may return the completion packet after the data packet is written to the memory, if the field indicates the data packet was sent due to a flush operation.

Hence, examples of present techniques may delay indication of a write completion until the data is committed for a flush operation, and give indication of the write completion immediately after data is received by the device but before the data is committed, for a cache capacity eviction. With this modification to a processor's coherent protocol, examples may be able to speed up or prevent slowing down write operations that do not require commitment to persistent memory, such as a cache capacity eviction. Moreover, examples may not require changes to write operations that do require commitment to persistent memory, such as flush operations.

Figure 1:
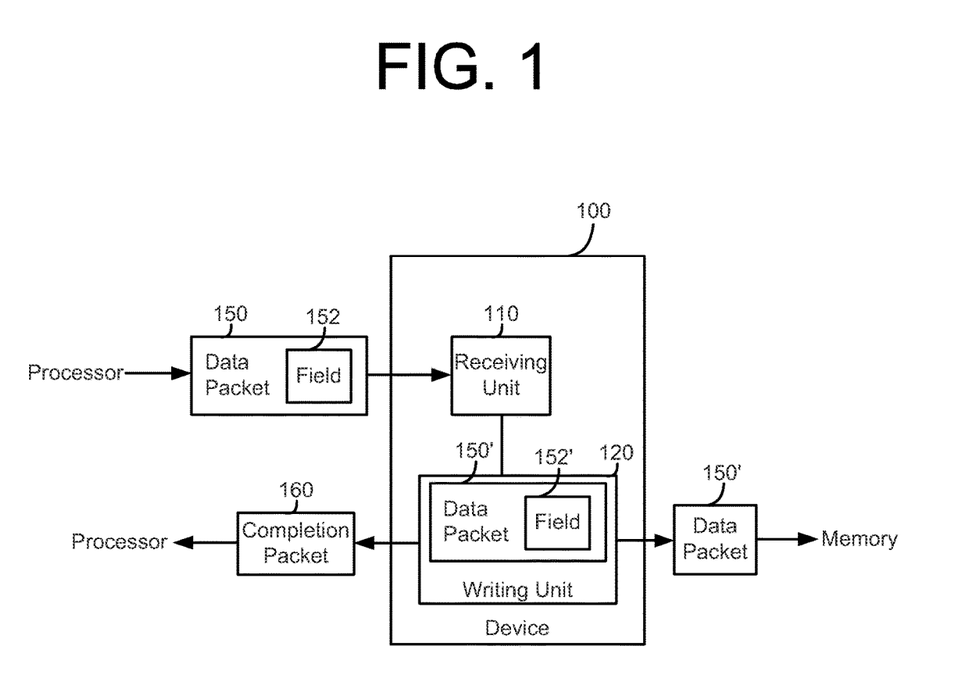
FIG. 1 is an example block diagram of a device to return a completion packet.

Referring now to the drawings, FIG. 1 is an example block diagram of a device 100 to return a completion packet. The device 100 may couple to or be included in any type of computing device including a memory, such as a controller, a notebook computer, a desktop computer, an all-in-one system, a server, a network device, a wireless device, a storage device, a mobile device, a thin client, a retail point of sale device, a gaming device, a scientific instrument, and the like.

In the example of FIG. 1, device 100 includes a receiving unit 110 and a writing unit 120. The receiving and writing units 110 and 120 may include, for example, a hardware device including electronic circuitry for implementing the functionality described below, such as control logic and/or memory. In addition or as an alternative, the receiving and writing units 110 and 120 may be implemented as a series of instructions encoded on a machine-readable storage medium and executable by a processor.

The receiving unit 110 may receive a data packet 150 including a field 152. The term packet may refer to a unit of data. The term field may refer to a portion of the packet that stores, for example, control information. Here, the data packet 150 may include data along with an address at which the data is to be written, with the device 100 acting as a memory controller. The data packet may be sent from a processor.

The writing unit 120 may return a completion packet 160 in response to the data packet 150'. The completion packet 160 may indicate to the processor that the data packet 150' has been accepted by the device 100. In turn, the processor may assume the data packet 150' has been written to a memory (not shown), such as a nonvolatile memory like a hard disk drive (HDD), solid state drive (SSD) or a flash memory, and resume other processes.

The writing unit 120 may return the completion packet 160 before the data packet 150' is actually written to the memory, if the field 152' indicates the data packet 150 was sent due to a cache capacity eviction. On the other hand, the writing unit 120 may return the completion packet 160 after the data packet 150' is actually written to the memory, if the field 152' indicates the data packet 150' was sent due to a flush operation. However, the writing unit 120 may still return the completion packet 160 after the receiving unit 110 has at least received the data packet 150, if the field 152' indicates the data packet 150' was sent due to the cache capacity eviction.

Cache capacity eviction may relate to eviction from a cache (not shown) of the processor that has reached capacity. For instance, if the cache is full and the processor is looking to place new data into the cache, old data from the cache may be evicted. The old data may be sent to be written to memory, such as if the old data has been modified from the existing copy in the memory. Deciding which data or cache line to evict may be determined by an algorithm.

A flush operation may relate to flushing data from the cache to the memory, due to an instruction executed by the processor. For example, the instruction may cause data of an effective address to be flushed from the cache to a main memory. Example reasons for the flush may be to prevent data, structural and/or branch hazards as well as cache management.

Figure 2:
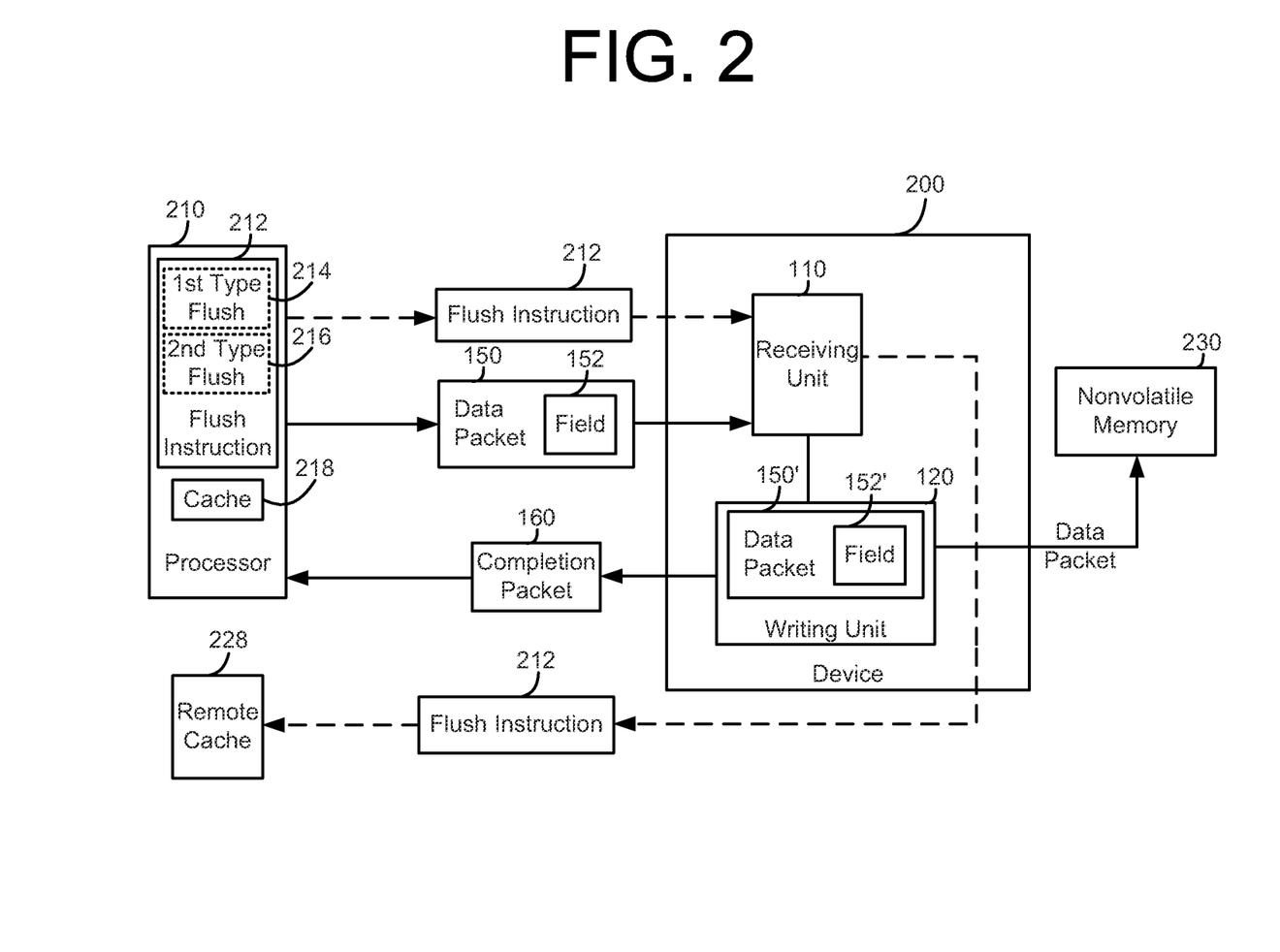
FIG. 2 is another example block diagram of a device to return a completion packet.

FIG. 2 is another example block diagram of a device 200 to return a completion packet. The device 200 may couple to or be included in any type of computing device including a memory, such as a controller, a notebook computer, a desktop computer, an all-in-one system, a server, a network device, a wireless device, a storage device, a mobile device, a thin client, a retail point of sale device, a gaming device, a scientific instrument, and the like.

The device 200 of FIG. 2 may include at least the functionality and/or hardware of the device 100 of FIG. 1. For example, the device 200 of FIG. 2 includes the receiving and writing units 110 and 120. The device 200 is further shown to interface with a processor 210, a nonvolatile memory (NVM) 230 and a remote cache 228. The processor 210 may be at least one central processing unit (CPU), at least one semiconductor-based microprocessor, or any other hardware device suitable for retrieval and execution of instructions. The NVM 230 may be any electronic, magnetic, optical, or other physical storage device that is able to store data persistently, such as a HDD, SDD and/or flash memory.

As noted above, certain operations, such as flush operations, may require a notification that the data has been written to the NVM 230, before they can be completed. Other types of operations, such as cache capacity eviction, do not require such assurances, before being signaled as completed. The writing unit 120 may send the completion packet 160 after the data packet 150 is guaranteed to be written to the NVM 230, if the field 152' indicates the data packet 150' was sent due to the flush operation. However, the writing unit 120 may send the completion packet 160 before the data packet 150' is guaranteed to be written to the NVM 230, if the field 152' indicates the data packet 150' was sent due to the cache capacity eviction. In this case, the data packet 150' may still be stored at an intermediary or non-persistent memory (not shown) when the completion packet 160 is sent to the processor 210, such as a buffer or volatile memory.

A value of the field 152 may be determined by the processor 210 based on if the data packet 150 is to be sent in response to an instruction executed by the processor 210. For example, the processor 210 may set the value of the field 152 to be a logical one if the data packet 150 is sent due to a flush instruction 212 and set the value of the field 152 to be a logical zero if the data packet 150 is sent due to a cache capacity eviction, or vice versa.

In one example, the flush instruction 212 to be executed by the processor 210 may itself indicate the value of the field 152, instead of the processor 210. For example, a first type of the flush instruction 214 may set the field 152 to indicate that the data packet 150 was sent due to the flush operation. On the other hand, a second type of the flush instruction 216 may set the field 152 to indicate that the data packet 150 was sent due to the cache capacity eviction. The first type of the flush instruction 214 may relate to avoiding hazards while the second type of the flush instruction 216 may relate to cache management. Thus, the second type of the flush instruction 216 may have a lower urgency than the first type of the flush instruction 214 for being committed to memory 230, and therefore may be treated similarly to the cache capacity eviction.

The processor 210 may forward the flush instruction 212, instead of the data packet 150, to the receiving unit 110, if the data packet 150 indicated by the flush instruction 212 is not in the cache 218 of the processor 210. In turn, the receiving unit 110 may forward the flush instruction 212 to a remote cache 228. The remote cache 228 may be, for example, a cache of another processor or another device, such as Input/Output (I/O) or peripheral device. The flush instruction 212 may trigger a flush operation at the remote cache 228, if the data packet 150 indicated by the flush instruction 212 is in the remote cache 228.

In some implementations, the receiving unit 110 may not forward the flush instruction 212 to the remote cache 228, if the remote cache 228 observes the flush instruction 212 directly. For example, the remote cache 228 may monitor an address or a bus line (not shown), intercept the flush instruction 212, and send the corresponding data packet 150 to the receiving unit 110. This process may also be referred to as snooping. In this example, the receiving unit 110 may still consider a field in the flush instruction 212 to determine whether the completion packet 160 may be sent before the data packet 150 is written to the NVM 230.

In the case that the receiving unit 110 receives the flush instruction 212 indicating that data associated with a specific address is to be written to NVM 230 as indicated by the field, the receiving unit 110 may send the completion packet 160 after determining that the data is not stored locally, such as at a volatile buffer (not shown) of the device 200. If the data is stored locally, the receiving unit 110 may first write the data to the NVM 230, before sending the completion packet 160.

Figure 3:
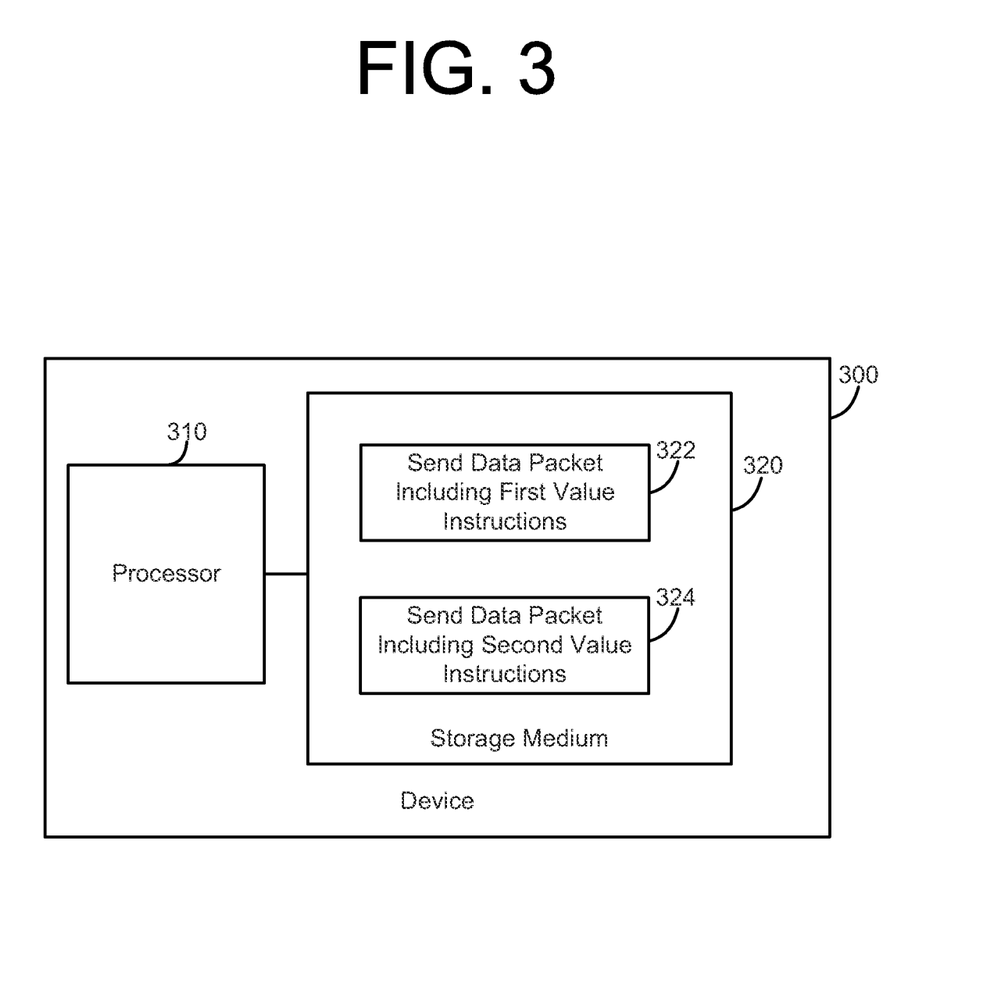
FIG. 3 is an example block diagram of a computing device including instructions for sending a data packet.

FIG. 3 is an example block diagram of a computing device 300 including instructions for sending a data packet. In FIG. 3, the computing device 300 includes a processor 310 and a machine-readable storage medium 320. The machine-readable storage medium 320 further includes instructions 322 and 324 for returning the completion packet.

The computing device 300 may be, for example, a controller, a secure microprocessor, a notebook computer, a desktop computer, an all-in-one system, a server, a network device, a wireless device, or any other type of user device capable of executing the instructions 322 and 324. In certain examples, the computing device 300 may include or be connected to additional components such as memories, sensors, displays, etc.

The processor 310 may be, at least one central processing unit (CPU), at least one semiconductor-based microprocessor, other hardware devices suitable for retrieval and execution of instructions stored in the machine-readable storage medium 320, or combinations thereof. The processor 310 may fetch, decode, and execute instructions 322 and 324 to implement returning the completion packet. As an alternative or in addition to retrieving and executing instructions, the processor 310 may include at least one integrated circuit (IC), other control logic, other electronic circuits, or combinations thereof that include a number of electronic components for performing the functionality of instructions 322 and 324.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for returning the completion packet.

Figure 4:
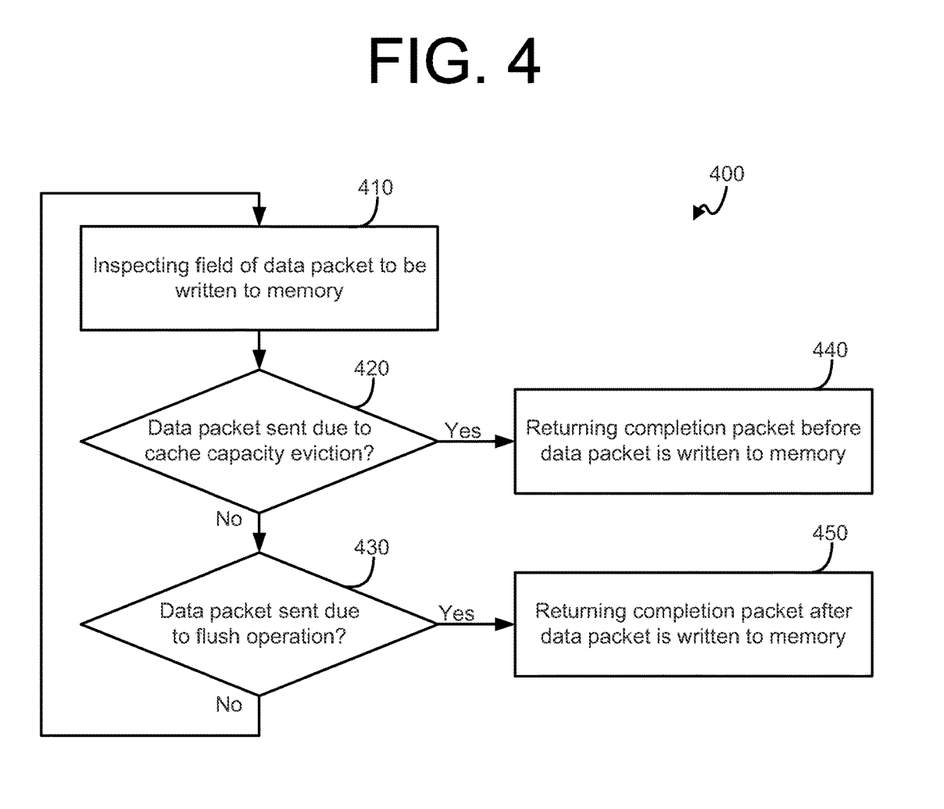
FIG. 4 is an example flowchart of a method for returning a completion packet.

Moreover, the instructions 322 and 324 when executed by a processor (e.g., via one processing element or multiple processing elements of the processor) can cause the processor to perform processes, such as, the process of FIG. 4. For example, the send data packet including first value instructions 322 may be executed by the processor 310 to send a data packet (not shown) with a field of the data packet including a first value, if the data packet was sent due to a flush operation. The send data packet including second value instructions 324 may be executed by the processor 310 to send the data packet with the field of the data packet including a second value, if the data packet was sent due to a cache capacity eviction. For example, the first value may be a logical one and the second value may be a logical zero, or vice versa.

The data packet may be sent to a memory controller (not shown). The memory controller may vary a timing for returning a completion packet (not shown) to the processor in response to the data packet based on a value of the field of the data packet. For example, the memory controller may return the completion packet after a write operation is completed, if the field of the data packet indicates the data packet was sent due to the flush operation. On the other hand, the memory controller may return the completion packet before the write operation is completed, if the field of the data packet indicates the data packet was sent due to the cache capacity eviction.

FIG. 4 is an example flowchart of a method 400 for returning a completion packet. Although execution of the method 400 is described below with reference to the device 200, other suitable components for execution of the method 400 can be utilized, such as the device 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 200 inspects a field 152' of a data packet 150' to be written to memory 230. Then, at block 420, if the field 152' indicates the data packet 150' was sent due to a cache capacity eviction, the method 400 flows to block 440, where the device 200 returns a completion packet 160 before the data packet 150' is written to the memory 230. However, if the field 152' does not indicate the data packet 150' was sent due to a cache capacity eviction, the method 400 flows from block 420 to block 430. At block 430, if the field 152' indicates the data packet 150' was sent due to a flush operation, the method 400 flows to block 450, where the device 200 returns the completion packet 160 after the data packet 150' is written to the memory 230.

The data packet 150 may be sent from a processor 210. The field 152 may be set by the processor 210 based on a status of a cache 218 of the processor 210 and/or a type of instruction 212 executed by the processor 210. For example, the processor 210 may set the field 152 to indicate the cache capacity eviction if the data packet is sent due cache management policies, such as the cache reaching capacity. The processor 210 may set the field 152 to indicate the flush operation if the processor 210 executes a flush instruction.

The data packet 150 may not be guaranteed to be written to a nonvolatile memory 230 when the completion packet 160 is returned, if the field 152 indicates the data packet 150 was sent due to the cache capacity eviction. The data packet may be guaranteed to be written to the nonvolatile memory 230 when the completion packet 160 is returned, if the field 152 indicates the data packet 150 was sent due to the flush operation.

We claim:

1. A device, comprising:
a receiving circuit to receive a data packet including a field; and
a writing circuit to return a completion packet in response to the data packet, wherein
the writing circuit is to return the completion packet before the data packet is written to a memory, if the field indicates the data packet was sent due to a cache capacity eviction, and
the writing circuit is to return the completion packet after the data packet is written to the memory, if the field indicates the data packet was sent due to a flush operation.

2. The device of claim 1, wherein the writing circuit is to return the completion packet after the receiving circuit receives the data packet, if the field indicates the data packet was sent due to the cache capacity eviction.

3. The device of claim 1, wherein,
the data packet is not guaranteed to be written to a nonvolatile memory, if the field indicates the data packet was sent due to the cache capacity eviction, and
the data packet is guaranteed to be written to the nonvolatile memory, if the field indicates the data packet was sent due to the flush operation.

4. The device of claim 1, wherein,
the data packet is sent from a processor,
the cache capacity eviction relates to eviction from a cache of the processor that has reached capacity, and
the completion packet indicates to the processor that the data packet has been accepted by device.

5. The device of claim 4, wherein a value of the field is determined by the processor based on if the data packet is to be sent in response to an instruction executed by the processor.

6. The device of claim 5, wherein a flush instruction to be executed by the processor indicates the value of the field.

7. The device of claim 6, wherein,
a first type of the flush instruction is to set the field to indicate that the data packet was sent due to the flush operation, and
a second type of the flush instruction is to set the field to indicate that the data packet was sent due to the cache capacity eviction.

8. The device of claim 6, wherein,
the processor is to forward the flush instruction to the receiving circuit, if data indicated by the flush instruction is not in the cache of the processor,
the receiving circuit is to forward the flush instruction to a remote cache, and
the flush instruction is to trigger a flush operation at the remote cache, if the data indicated by the flush instruction is in the remote cache.

9. The device of claim 8, wherein the receiving circuit is to send the completion packet one of before and after writing the data to the memory in response to the flush instruction, based on if the data is at the receiving circuit when the flush instruction is received.

10. A method, comprising:
inspecting a field of a data packet to be written to a memory;
returning a completion packet before the data packet is written to the memory, if the field indicates the data packet was sent due to a cache capacity eviction; and
returning the completion packet after the data packet is written to the memory, if the field indicates the data packet was sent due to a flush operation.

11. The method of claim 10, wherein,
the data packet is sent from a processor, and
the field is set by the processor based on at least one of a status of a cache of the processor and a type of instruction executed by the processor.

12. The method of claim 11, wherein,
the processor is to set the field to indicate the cache capacity eviction if the data packet is sent due to cache management, and
the data packet is not guaranteed to be written to a nonvolatile memory when the completion packet is returned, if the field indicates the data packet was sent due to the cache capacity eviction.

13. The method of claim 11, wherein,
the processor is to set the field to indicate the flush operation if the processor executes a flush instruction, and
the data packet is guaranteed to be written to a nonvolatile memory when the completion packet is returned, if the field indicates the data packet was sent due to the flush operation.

14. A non-transitory computer-readable storage medium storing instructions that, if executed by a processor of a device, cause the processor to:
send a data packet with a field of the data packet including a first value, if the data packet was sent due to a flush operation; and
send the data packet with the field of the data packet including a second value, if the data packet was sent due to a cache capacity eviction, wherein
the data packet is sent to a memory controller, and
the memory controller is to vary a timing for returning a completion packet in response to the data packet based on a value of the field of the data packet.

15. The non-transitory computer-readable storage medium of claim 14, wherein,
the memory controller is to return the completion packet after a write operation is completed, if the field of the data packet indicates the data packet was sent due to the flush operation, and
the memory controller is to return the completion packet before the write operation is completed, if the field of the data packet indicates the data packet was sent due to the cache capacity eviction.

16. A non-transitory computer-readable storage medium storing instructions that are executable by a controller to:
receive a data packet including a field;
return a completion packet in response to the data packet, wherein
the completion packet is returned before the data packet is written to a memory, if the field indicates the data packet was sent due to a cache capacity eviction, and
the completion packet is returned after the data packet is written to the memory, if the field indicates the data packet was sent due to a flush operation.

17. The non-transitory computer-readable storage medium of claim 16, wherein the instructions are executable by the controller to:
return the completion packet after the data packet is received, if the field indicates the data packet was sent due to the cache capacity eviction.

18. The non-transitory computer-readable storage medium of claim 16, wherein,
the data packet is not guaranteed to be written to a nonvolatile memory, if the field indicates the data packet was sent due to the cache capacity eviction, and
the data packet is guaranteed to be written to the nonvolatile memory, if the field indicates the data packet was sent due to the flush operation.

19. The non-transitory computer-readable storage medium of claim 16, wherein,
the data packet is sent from a processor,
the cache capacity eviction relates to eviction from a cache of the processor that has reached capacity, and
the completion packet indicates to the processor that the data packet has been accepted by device.

20. The non-transitory computer-readable storage medium of claim 19, wherein a value of the field is determined by the processor based on if the data packet is to be sent in response to an instruction executed by the processor.

21. The non-transitory computer-readable storage medium of claim 20, wherein a flush instruction to be executed by the processor indicates the value of the field.

22. The non-transitory computer-readable storage medium of claim 21, wherein
a first type of the flush instruction is to set the field to indicate that the data packet was sent due to the flush operation, and
a second type of the flush instruction is to set the field to indicate that the data packet was sent due to the cache capacity eviction.

23. The non-transitory computer-readable storage medium of claim 22, wherein the instructions are executable by the controller to send the completion packet one of before and after writing the data to the memory in response to the flush instruction, based on if the data is at the controller when the flush instruction is received.

24. The non-transitory computer-readable storage medium of claim 21, wherein
- the processor is to forward the flush instruction to the controller, if data indicated by the flush instruction is not in the cache of the processor,
- the instructions are executable by the controller to forward the flush instruction to a remote cache, and
- the flush instruction is to trigger a flush operation at the remote cache, if the data indicated by the flush instruction is in the remote cache.

* * * * *